United States Patent
Ekberg et al.

(10) Patent No.: US 9,660,810 B2
(45) Date of Patent: May 23, 2017

(54) METHOD AND APPARATUS FOR PROVIDING SECRET DELEGATION

(75) Inventors: Jan-Erik Ekberg, Vantaa (FI); Lauri Veikko Paatero, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/111,287

(22) PCT Filed: Apr. 15, 2011

(86) PCT No.: PCT/IB2011/051654
§ 371 (c)(1),
(2), (4) Date: Oct. 11, 2013

(87) PCT Pub. No.: WO2012/140477
PCT Pub. Date: Oct. 18, 2012

(65) Prior Publication Data
US 2014/0026200 A1    Jan. 23, 2014

(51) Int. Cl.
*H04L 9/32* (2006.01)
*H04L 29/06* (2006.01)
*H04W 12/04* (2009.01)

(52) U.S. Cl.
CPC ........ *H04L 9/3236* (2013.01); *H04L 63/0428* (2013.01); *H04L 63/061* (2013.01); *H04W 12/04* (2013.01); *G06F 2221/2111* (2013.01); *H04L 2209/56* (2013.01)

(58) Field of Classification Search
CPC . H04L 63/0428; H04L 63/061; H04L 9/0643; H04L 9/085
See application file for complete search history.

(56) References Cited

U.S. PATENT DOCUMENTS

| | | | | |
|---|---|---|---|---|
| 2002/0083014 A1* | 6/2002 | Brickell et al. | ................. | 705/76 |
| 2003/0233550 A1* | 12/2003 | Brickell | ................. | G06F 21/85 713/171 |
| 2004/0243811 A1* | 12/2004 | Frisch | ................. | H04L 9/3281 713/176 |
| 2005/0071280 A1 | 3/2005 | Irwin et al. | | |

(Continued)

FOREIGN PATENT DOCUMENTS

EP    1383265    1/2004

OTHER PUBLICATIONS

International Search Report received for corresponding Patent Cooperation Treaty Application No. PCT/IB2011/051654, dated Feb. 6, 2012, 4 pages.

(Continued)

*Primary Examiner* — Robert Leung
(74) *Attorney, Agent, or Firm* — Mintz Levin Cohn Ferris Glovsky and Popeo, P.C.

(57) ABSTRACT

A method for providing secret delegation may comprise receiving a credential secret applied to an algorithm associated with a distributed application in a trusted execution environment, causing delegation of the credential secret from one communication device to at least one other communication device, and modifying the credential secret prior to transfer of a modified version of the credential secret to the at least one other communication device in a manner that enables a generation of the credential secret to be determined. An apparatus and computer program product corresponding to the method are also provided.

16 Claims, 5 Drawing Sheets

(56) References Cited

U.S. PATENT DOCUMENTS

| | | |
|---|---|---|
| 2009/0077643 A1 | 3/2009 | Schmidt et al. |
| 2009/0132811 A1* | 5/2009 | Koster et al. ............... 713/156 |
| 2009/0154709 A1* | 6/2009 | Ellison ...................... 380/282 |
| 2010/0106972 A1* | 4/2010 | Melen et al. ............... 713/171 |
| 2012/0239936 A1* | 9/2012 | Holtmanns et al. ......... 713/176 |

OTHER PUBLICATIONS

Crampton, J., et al., "User-friendly and certificate-free grid security infrastructure", International Journal of Information Security, vol. 10, No. 3, Feb. 2011. pp. 137-153.

Moralis, A., et al., "A Kerberos security architecture for web services based instrumentation grids", Future Generations Computer Systems, vol. 25, No. 7, Jul. 1, 2009. pp. 804-818.

Straub, T., et al., "A Multipurpose Delegation Proxy for WWW Credentials", EuroPKI'05 Proceedings of the Second European conference on Public Key Infrastructure, 2005. pp. 1-21.

Welch, V., et al., "X.509 Proxy Certificates for Dynamic Delegation", 3rd Annual PKI R&D Workshop, 2004.

* cited by examiner

METHOD AND APPARATUS FOR PROVIDING SECRET DELEGATION

RELATED APPLICATION

This application was originally filed as PCT Application No. PCT/IB2011/051654 filed Apr. 15, 2011.

TECHNOLOGICAL FIELD

Embodiments of the present invention relate generally to device security technology and, more particularly, relate to a method and apparatus for providing secret delegation that may be used for credentials employed in connection with an authentication mechanism.

BACKGROUND

Security of mobile terminals, such as portable communication devices (PCDs) (e.g., cellular telephones), portable digital assistants (PDAs), laptop computers, or any suitable device that is capable of communicating with a wireless network, is increasingly important to owners of electronic communication devices. Security may be particularly important in relation to distributed applications such as online banking applications, or the provision of access to web-based services or enterprise networks. In some cases, cryptographic protocols may be used to provide security in these and other environments. These cryptographic protocols may use "credentials" that include items of secret data (e.g., keys) and associated algorithms that apply cryptographic transforms to the secret data.

Approaches to managing secure storage and use of credentials can range from relatively cheap and flexible mechanisms that are not as secure (e.g., password managers) to more secure, but expensive and inflexible mechanisms (e.g., hardware tokens). Thus, it may be desirable to provide relatively high security without great complication, inflexibility and expense.

BRIEF SUMMARY OF SOME EXAMPLES

A method, apparatus and computer program product are therefore provided to enable the provision of a lightweight approach to providing a relatively high level of security. In this regard, for example, a mechanism is provided for providing a delegation mechanism for use in connection with authentication based on secrets or credentials.

In an example embodiment, a method of providing secret delegation is provided. The method may comprise receiving a credential secret applied to an algorithm associated with a distributed application in a trusted execution environment, causing delegation of the credential secret from one communication device to at least one other communication device, and modifying the credential secret prior to transfer of a modified version of the credential secret to the at least one other communication device in a manner that enables a generation of the credential secret to be determined.

In another example embodiment, a computer program product for providing secret delegation is provided. The computer program product comprises at least one computer-readable storage medium having computer-executable program code instructions stored therein. The computer-executable program code instructions may comprise program code instructions for receiving a credential secret applied to an algorithm associated with a distributed application in a trusted execution environment, causing delegation of the credential secret from one communication device to at least one other communication device, and modifying the credential secret prior to transfer of a modified version of the credential secret to the at least one other communication device in a manner that enables a generation of the credential secret to be determined.

In another example embodiment, an apparatus for providing secret delegation is provided. The apparatus may comprise at least one processor and at least one memory including computer program code. The at least one memory and the computer program code may be configured, with the at least one processor, to cause the apparatus to perform at least receiving a credential secret applied to an algorithm associated with a distributed application in a trusted execution environment, causing delegation of the credential secret from one communication device to at least one other communication device, and modifying the credential secret prior to transfer of a modified version of the credential secret to the at least one other communication device in a manner that enables a generation of the credential secret to be determined.

In yet another example embodiment, an apparatus for providing secret delegation is provided. The apparatus may comprise means for receiving a credential secret applied to an algorithm associated with a distributed application in a trusted execution environment, means for causing delegation of the credential secret from one communication device to at least one other communication device, and means for modifying the credential secret prior to transfer of a modified version of the credential secret to the at least one other communication device in a manner that enables a generation of the credential secret to be determined.

Embodiments of the invention may provide a method, apparatus and computer program product for employment, for example, in mobile or fixed environments. As a result, for example, computing device users may enjoy an improved capability for securely accessing content, services and/or information.

BRIEF DESCRIPTION OF THE SEVERAL VIEWS OF THE DRAWING(S)

Having thus described some embodiments of the invention in general terms, reference will now be made to the accompanying drawings, which are not necessarily drawn to scale, and wherein:

DETAILED DESCRIPTION OF SOME EMBODIMENTS

Some embodiments of the present invention will now be described more fully hereinafter with reference to the accompanying drawings, in which some, but not all embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein a "computer-readable storage medium," which refers to a non-transitory, physical storage medium (e.g., volatile or non-volatile memory device), can be differentiated from a "computer-readable transmission medium," which refers to an electromagnetic signal.

Electronic devices, both mobile and fixed, continue to evolve in relation to their ability to interact with distributed applications. Credential migration and transfer, for use in such environments, can be a complex undertaking. Some credentials may or may not be transferable by intent and, in some cases, the ability to perform credential migration or transfer may further depend on the entity that validates a credential. On Board Credentials (ObC) provides a secure environment for storing credential secrets as well as an execution environment where credential code, operating on those secrets, may be executed in isolation from an operation system of a device. ObC may also provide mechanisms for device authentication (e.g., where a manufacturer attests to the fact that an ObC enabled device is secure). In some cases, there may be a feature for providing signed attestation evidence for the fact that a key (e.g., an RSA key) is accessible with key usage to only a specific credential code identified by its code signature (e.g., using a code hash as an identifier).

In some embodiments, the ObC architecture may provide for self provisioning of a code, where a credential itself may be enabled to generate a trusted, device-specific context in which it can store and maintain secrets. Credential migration and control may be arranged by attaching metadata to a credential. The execution context in ObC may be controlled and isolated using various families. Thus, adding metadata to the provisioning of contexts may provide a solution for both defining and managing the transfer of credentials. However, this approach may make for a relatively complex and brittle implementation requiring an explicitly defined migration protocol and a rule set for migration that must be known in advance. In addition to complexity, syntax requirements of a migration service may suffer from a need to define it before deploying it.

Accordingly, some example embodiments may provide a lightweight solution to handling credential migration. In this regard, for example, some example embodiments may provide an architecture and implementation that make use of self provisioning capabilities of an ObC program along with support for device attestation in order to construct a lightweight delegation system for credentials that may be used as a migration system with any authentication mechanism that relies on symmetric secrets. Symmetric secrets may be the same (or derived) secrets being deployed both on a server (or validating entity) and a device being authenticated (e.g., an ObC enabled terminal). However, it should be appreciated that example embodiments need not necessarily be employed only in client-server environments. Indeed, some example embodiments may also be practiced in peer-to-peer (P2P) environments. The delegation code may be the same for any authentication mechanism and may be isolated (e.g., in a subroutine). The delegation function may be embodied in a module or entity that may be relatively small in size, and may easily fit size constraints that may be implied by, for example, ObC or other trusted execution environments.

Figure 1:
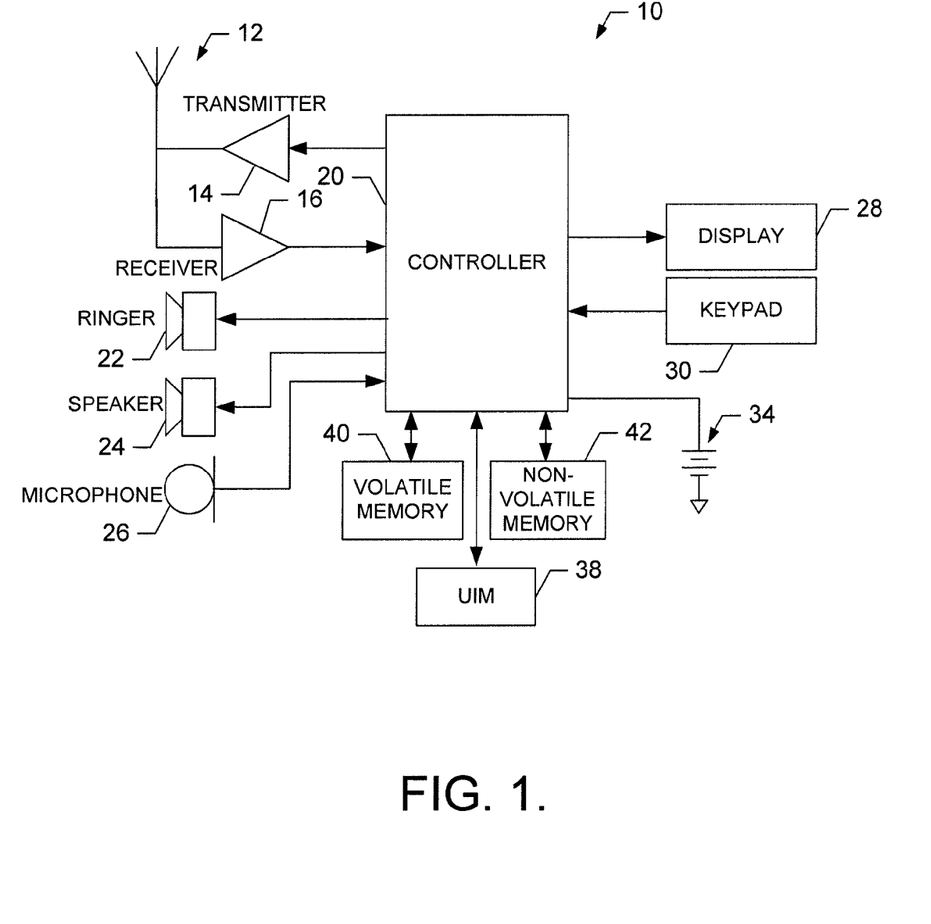
FIG. 1 illustrates a block diagram of a mobile terminal that may benefit from an example embodiment of the present invention.

FIG. 1, one example embodiment of the invention, illustrates a block diagram of a mobile terminal 10 that may benefit from embodiments of the present invention. It should be understood, however, that a mobile terminal as illustrated and hereinafter described is merely illustrative of one type of device that may benefit from embodiments of the present invention and, therefore, should not be taken to limit the scope of embodiments of the present invention. While several embodiments of the mobile terminal 10 may be illustrated and hereinafter described for purposes of example, other types of mobile terminals, such as portable digital assistants (PDAs), pagers, mobile televisions, gaming devices, all types of computers (e.g., laptops or mobile computers), cameras, audio/video players, radio, global positioning system (GPS) devices, or any combination of the aforementioned, and other types of communications systems, may readily employ embodiments of the present invention. Furthermore, fixed electronic devices (e.g., personal computers (PCs), network access terminals, and/or the like) may also employ example embodiments in some cases.

The mobile terminal 10 may comprise an antenna 12 (or multiple antennas) in operable communication with a transmitter 14 and a receiver 16. The mobile terminal 10 may further comprise an apparatus, such as a controller 20 or other processor, that provides signals to and receives signals from the transmitter 14 and receiver 16, respectively. The signals may comprise signaling information in accordance with the air interface standard of the applicable cellular system, and/or may also comprise data corresponding to user speech, received data and/or user generated data. In this regard, the mobile terminal 10 may be capable of operating with one or more air interface standards, communication protocols, modulation types, and access types. By way of illustration, the mobile terminal 10 may be capable of operating in accordance with any of a number of first, second, third and/or fourth-generation communication protocols or the like. For example, the mobile terminal 10 may be capable of operating in accordance with second-generation (2G) wireless communication protocols IS-136 (time division multiple access (TDMA)), GSM (global system for mobile communication), and IS-95 (code division multiple access (CDMA)), or with third-generation (3G) wireless communication protocols, such as Universal Mobile Telecommunications System (UMTS), CDMA2000, wideband CDMA (WCDMA) and time division-synchronous CDMA (TD-SCDMA), with 3.9G wireless communication protocol such as E-UTRAN (evolved-universal terrestrial radio access network), with fourth-generation (4G) wireless communication protocols or the like. As an alternative (or additionally), the mobile terminal 10 may be capable of operating in accordance with non-cellular communication mechanisms. For example, the mobile terminal 10 may be capable of communication in a wireless local area network (WLAN) or other communication networks.

It is understood that the apparatus, such as the controller 20, may comprise circuitry implementing, among others, audio and logic functions of the mobile terminal 10. For example, the controller 20 may comprise a digital signal processor device, a microprocessor device, and various analog to digital converters, digital to analog converters, and/or other support circuits. Control and signal processing functions of the mobile terminal 10 are allocated between these devices according to their respective capabilities. The controller 20 thus may also comprise the functionality to convolutionally encode and interleave message and data prior to modulation and transmission. The controller 20 may additionally comprise an internal voice coder, and may comprise an internal data modem. Further, the controller 20 may comprise functionality to operate one or more software programs, which may be stored in memory. For example, the controller 20 may be capable of operating a connectivity program, such as a conventional Web browser. The connectivity program may then allow the mobile terminal 10 to transmit and receive Web content, such as location-based content and/or other web page content, according to a Wireless Application Protocol (WAP), Hypertext Transfer Protocol (HTTP) and/or the like, for example.

The mobile terminal 10 may also comprise a user interface including an output device such as an earphone or speaker 24, a ringer 22, a microphone 26, a display 28, and a user input interface, which may be coupled to the controller 20. The user input interface, which allows the mobile terminal 10 to receive data, may comprise any of a number of devices allowing the mobile terminal 10 to receive data, such as a keypad 30, a touch display (not shown specifically, although the display 28 may, in some cases, be an example), a microphone or other input device. In embodiments including the keypad 30, the keypad 30 may comprise numeric (0-9) and related keys (#, *), and other hard and soft keys used for operating the mobile terminal 10. Alternatively, the keypad 30 may comprise a conventional QWERTY keypad arrangement. The keypad 30 may also comprise various soft keys with associated functions. In addition, or alternatively, the mobile terminal 10 may comprise an interface device such as a joystick or other user input interface. The mobile terminal 10 further comprises a battery 34, such as a vibrating battery pack, for powering various circuits that are used to operate the mobile terminal 10, as well as optionally providing mechanical vibration as a detectable output.

The mobile terminal 10 may further comprise a user identity module (UIM) 38, which may generically be referred to as a smart card. The UIM 38 is typically a memory device having a processor built in. The UIM 38 may comprise, for example, a subscriber identity module (SIM), a universal integrated circuit card (UICC), a universal subscriber identity module (USIM), a removable user identity module (R-UIM), or any other smart card. The UIM 38 typically stores information elements related to a mobile subscriber. In addition to the UIM 38, the mobile terminal 10 may be equipped with memory. For example, the mobile terminal 10 may comprise volatile memory 40, such as volatile Random Access Memory (RAM) including a cache area for the temporary storage of data. The mobile terminal 10 may also comprise other non-volatile memory 42, which may be embedded and/or may be removable. The non-volatile memory 42 may additionally or alternatively comprise an electrically erasable programmable read only memory (EEPROM), flash memory or the like. The memories may store any of a number of pieces of information, and data, used by the mobile terminal 10 to implement the functions of the mobile terminal 10.

Figure 2:
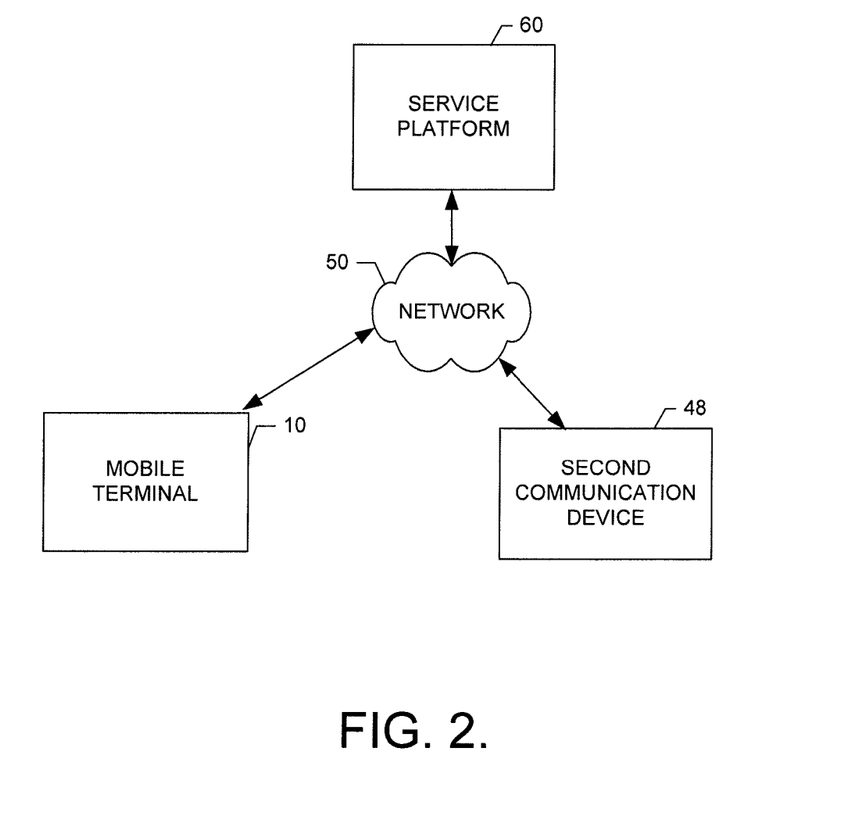
FIG. 2 is a schematic block diagram of a wireless communications system according to an example embodiment of the present invention.

FIG. 2 is a schematic block diagram of a wireless communications system according to an example embodiment of the present invention. Referring now to FIG. 2, an illustration of one type of system that would benefit from embodiments of the present invention is provided. As shown in FIG. 2, a system in accordance with an example embodiment of the present invention comprises a first communication device (e.g., mobile terminal 10) and in some cases also a second communication device 48 that may each be capable of communication with a network 50. The second communication device 48 may be another mobile terminal, or a fixed computer or computer terminal (e.g., a personal computer (PC)). The second communication device 48 is provided to illustrate that example embodiments may be practiced on multiple devices or in connection with multiple devices. Thus, there may be multiplicity with respect to instances of other devices that may be comprised in the network 50 and that may practice example embodiments independent of, or in connection with, the network 50. The communications devices of the system may be able to communicate with network devices or with each other via the network 50. In some cases, the network devices with which the communication devices of the system communicate may comprise a service platform 60. In an example embodiment, the mobile terminal 10 (and/or the second communication device 48) is enabled to communicate with the service platform 60 to provide, request and/or receive information. However, in some embodiments, not all systems that employ embodiments of the present invention may comprise all the devices illustrated and/or described herein.

In an example embodiment, the network 50 comprises a collection of various different nodes, devices or functions that are capable of communication with each other via corresponding wired and/or wireless interfaces. As such, the illustration of FIG. 2 should be understood to be an example of a broad view of certain elements of the system and not an all inclusive or detailed view of the system or the network 50. Although not necessary, in some embodiments, the network 50 may be capable of supporting communication in accordance with any one or more of a number of first-generation (1G), second-generation (2G), 2.5G, third-generation (3G), 3.5G, 3.9G, fourth-generation (4G) mobile communication protocols, Long Term Evolution (LTE), LTE advanced (LTE-A), and/or the like.

One or more communication terminals such as the mobile terminal 10 and the second communication device 48 may be capable of communication with each other via the network 50 and each may comprise an antenna or antennas for transmitting signals to and for receiving signals from a base site, which could be, for example a base station that is a part of one or more cellular or mobile networks or an access point that may be coupled to a data network, such as a local area network (LAN), a metropolitan area network (MAN), and/or a wide area network (WAN), such as the Internet. In turn, other devices such as processing devices or elements (e.g., personal computers, server computers or the like) may be coupled to the mobile terminal 10 and the second communication device 48 via the network 50. By directly or indirectly connecting the mobile terminal 10, the second communication device 48 and other devices to the network 50, the mobile terminal 10 and the second communication device 48 may be enabled to communicate with the other devices (or each other), for example, according to numerous communication protocols including Hypertext Transfer Protocol (HTTP) and/or the like, to thereby carry out various communication or other functions of the mobile terminal 10 and the second communication device 48, respectively.

Furthermore, although not shown in FIG. 2, the mobile terminal 10 and the second communication device 48 may communicate in accordance with, for example, radio frequency (RF), Bluetooth (BT), Infrared (IR) or any of a number of different wireline or wireless communication techniques, including LAN, wireless LAN (WLAN), Worldwide Interoperability for Microwave Access (WiMAX), WiFi, ultra-wide band (UWB), Wibree techniques and/or the like. As such, the mobile terminal 10 and the second communication device 48 may be enabled to communicate with the network 50 and each other by any of numerous different access mechanisms. For example, mobile access mechanisms such as wideband code division multiple access (W-CDMA), CDMA2000, global system for mobile communications (GSM), general packet radio service (GPRS) and/or the like may be supported as well as wireless access mechanisms such as WLAN, WiMAX, and/or the like and fixed access mechanisms such as digital subscriber line (DSL), cable modems, Ethernet and/or the like.

In an example embodiment, the service platform 60 may be a device or node such as a server or other processing device. The service platform 60 may have any number of functions or associations with various services. As such, for example, the service platform 60 may be a platform such as a dedicated server (or server bank) associated with a particular information source or service (e.g., an authentication service, security service, and/or the like), or the service platform 60 may be a backend server associated with one or more other functions or services. As such, the service platform 60 represents a potential host for a plurality of different services or information sources. In some embodiments, the functionality of the service platform 60 is provided by hardware and/or software components configured to operate in accordance with known techniques for the provision of information to users of communication devices. However, at least some of the functionality provided by the service platform 60 is information provided in accordance with example embodiments of the present invention.

In an example embodiment, the service platform 60 may host an apparatus for providing services related to providing secret delegation for online or off-line authentication with symmetric credentials according to an embodiment of the present invention. As such, in some embodiments, the service platform 60 may itself perform example embodiments, while in other embodiments, the service platform 60 may facilitate operation of an example embodiment at another device (e.g., the mobile terminal 10 and/or the second communication device 48). In still other example embodiments, the service platform 60 may not be included at all. In other words, in some embodiments, operations in accordance with an example embodiment may be performed at the mobile terminal 10 and/or the second communication device 48 without any interaction with the network 50 and/or the service platform 60 (e.g., in a P2P network where the mobile terminal 10 and the second communication device 48 directly communicate with each other, and possibly also other devices).

An example embodiment will now be described with reference to FIG. 3, in which certain elements of an apparatus for enabling the provision of secret delegation for online or off-line authentication with symmetric credentials are displayed. The apparatus of FIG. 3 may be employed, for example, on the service platform 60, the mobile terminal 10 and/or second communication device 48 of FIG. 2. However, it should be noted that the apparatus of FIG. 3, may also be employed on a variety of other devices. Therefore, example embodiments should not be limited to application on devices such as the service platform 60, the mobile terminal 10 or second communication device 48 of FIG. 2. Alternatively, embodiments may be employed on a combination of devices including, for example, those listed above. Accordingly, some example embodiments may be embodied wholly at a single device (e.g., the service platform 60, the mobile terminal 10 or the second communication device 48) or by devices in a client/server relationship (e.g., the service platform 60 serving information to the mobile terminal 10 and/or the second communication device 48). Furthermore, it should be noted that the devices or elements described below may not be mandatory and thus some may be omitted in certain embodiments.

Figure 3:
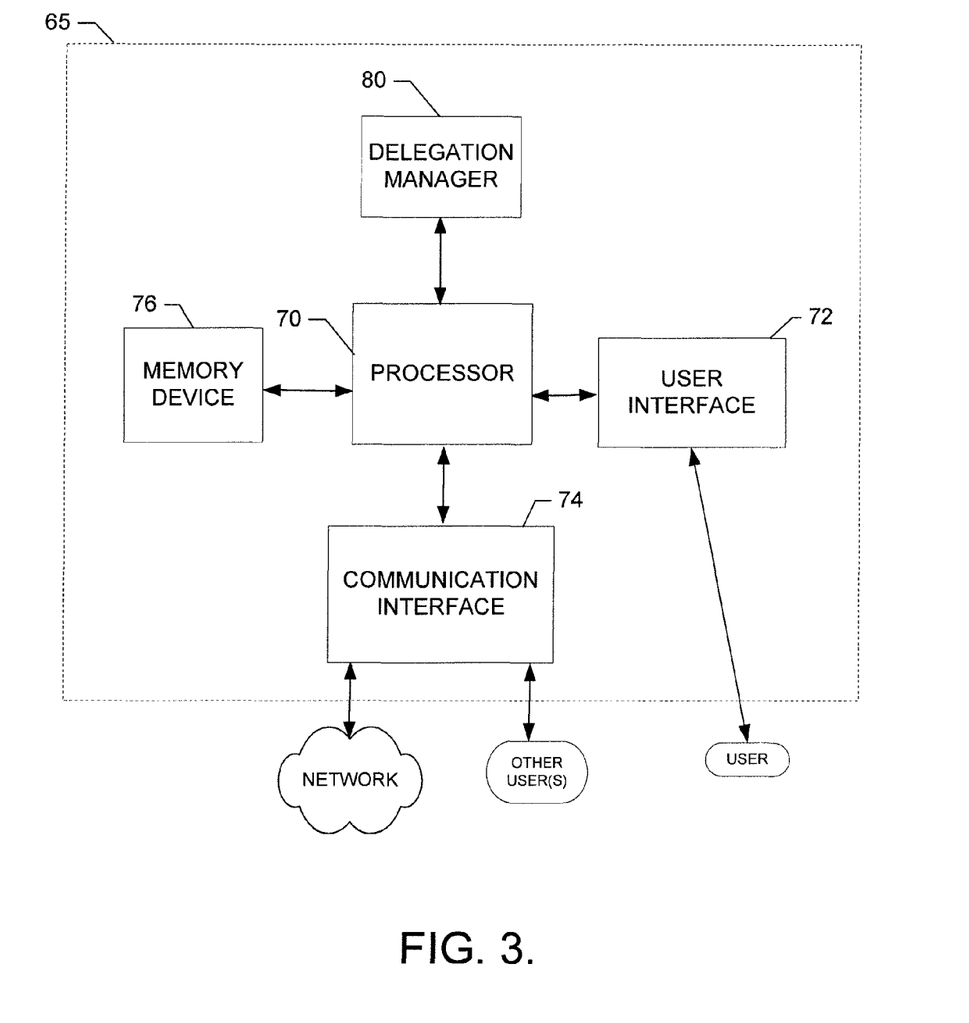
FIG. 3 illustrates an apparatus for enabling the provision of secret delegation according to an example embodiment of the present invention.

Referring now to FIG. 3, an apparatus 65 for enabling the provision of secret delegation for online or off-line authentication with symmetric credentials is provided. The apparatus 65 may comprise or otherwise be in communication with a processor 70, a user interface 72, a communication interface 74 and a memory device 76. The memory device 76 may comprise, for example, one or more volatile and/or non-volatile memories. In other words, for example, the memory device 76 may be an electronic storage device (e.g., a computer readable storage medium) comprising gates configured to store data (e.g., bits) that may be retrievable by a machine (e.g., a computing device like the processor 70). The memory device 76 may be configured to store information, data, applications, instructions or the like for enabling the apparatus to carry out various functions in accordance with example embodiments of the present invention. For example, the memory device 76 could be configured to buffer input data for processing by the processor 70. Additionally or alternatively, the memory device 76 could be configured to store instructions for execution by the processor 70.

The apparatus 65 may, in some embodiments, be a network device (e.g., service platform 60) or other devices (e.g., the mobile terminal 10 or the second communication device 48) that may operate independent of or in connection with a network. However, in some embodiments, the apparatus 65 may be instantiated at one or more of the service platform 60, the mobile terminal 10 and the second communication device 48. Thus, the apparatus 65 may be any computing device configured to employ an example embodiment of the present invention. However, in some embodiments, the apparatus 65 may be embodied as a chip or chip set (which may in turn be employed at one of the devices mentioned above). In other words, the apparatus 65 may comprise one or more physical packages (e.g., chips) including materials, components and/or wires on a structural assembly (e.g., a baseboard). The structural assembly may provide physical strength, conservation of size, and/or limitation of electrical interaction for component circuitry comprised thereon. The apparatus 65 may therefore, in some cases, be configured to implement an embodiment of the present invention on a single chip or as a single "system on a chip." As such, in some cases, a chip or chipset may constitute means for performing one or more operations for providing the functionalities described herein.

The processor 70 may be embodied in a number of different ways. For example, the processor 70 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 70 may comprise one or more processing cores configured to perform independently. A multi-core processor may enable multiprocessing within a single physical package. Additionally or alternatively, the processor 70 may comprise one or more processors configured in tandem via the bus to enable independent execution of instructions, pipelining and/or multithreading.

In an example embodiment, the processor 70 may be configured to execute instructions stored in the memory device 76 or otherwise accessible to the processor 70. Alternatively or additionally, the processor 70 may be configured to execute hard coded functionality. As such, whether configured by hardware or software methods, or by a combination thereof, the processor 70 may represent an entity (e.g., physically embodied in circuitry) capable of performing operations according to an embodiment of the present invention while configured accordingly. Thus, for example, when the processor 70 is embodied as an ASIC, FPGA or the like, the processor 70 may be specifically configured hardware for conducting the operations described herein. Alternatively, as another example, when the processor 70 is embodied as an executor of software instructions, the instructions may specifically configure the processor 70 to perform the algorithms and/or operations described herein when the instructions are executed. However, in some cases, the processor 70 may be a processor of a specific device (e.g., a mobile terminal or network device) adapted for employing an embodiment of the present invention by further configuration of the processor 70 by instructions for performing the algorithms and/or operations described herein. The processor 70 may comprise, among other things, a clock, an arithmetic logic unit (ALU) and logic gates configured to support operation of the processor 70.

Meanwhile, the communication interface 74 may be any means such as a device or circuitry embodied in either hardware or a combination of hardware and software that is configured to receive and/or transmit data from/to a network and/or any other device or module in communication with the apparatus 50. In this regard, the communication interface 74 may comprise, for example, an antenna (or multiple antennas) and supporting hardware and/or software for enabling communications with a wireless communication network. In some environments, the communication interface 74 may alternatively or also support wired communication. As such, for example, the communication interface 74 may comprise a communication modem and/or other hardware/software for supporting communication via cable, digital subscriber line (DSL), universal serial bus (USB) or other mechanisms.

The user interface 72 may be in communication with the processor 70 to receive an indication of a user input at the user interface 72 and/or to provide an audible, visual, mechanical or other output to the user. As such, the user interface 72 may comprise, for example, a keyboard, a mouse, a joystick, a display, a touch screen(s), touch areas, soft keys, a microphone, a speaker, or other input/output mechanisms. In an example embodiment in which the apparatus 65 is embodied as a server or some other network devices, the user interface 72 may be limited, or eliminated. However, in an embodiment in which the apparatus 65 is embodied as a communication device (e.g., the mobile terminal 10), the user interface 72 may comprise, among other devices or elements, any or all of a speaker, a microphone, a display, and a keyboard or the like. In this regard, for example, the processor 70 may comprise user interface circuitry configured to control at least some functions of one or more elements of the user interface, such as, for example, a speaker, ringer, microphone, display, and/or the like. The processor 70 and/or user interface circuitry comprising the processor 70 may be configured to control one or more functions of one or more elements of the user interface through computer program instructions (e.g., software and/or firmware) stored on a memory accessible to the processor 70 (e.g., memory device 76, and/or the like).

In an example embodiment, the processor 70 may be embodied as, comprise or otherwise control a delegation manager 80. As such, in some embodiments, the processor 70 may be said to cause, direct or control the execution or occurrence of the various functions attributed to the delegation manager 80 as described herein. The delegation manager 80 may be any means such as a device or circuitry operating in accordance with software or otherwise embodied in hardware or a combination of hardware and software (e.g., processor 70 operating under software control, the processor 70 embodied as an ASIC or FPGA specifically configured to perform the operations described herein, or a combination thereof) thereby configuring the device or circuitry to perform the corresponding functions of the delegation manager 80 as described herein. Thus, in examples in which software is employed, a device or circuitry (e.g., the processor 70 in one example) executing the software forms the structure associated with such means.

In some embodiments, the delegation manager 80 may be configured to facilitate provision of a delegation system for credentials that may employ any authentication mechanism that utilizes symmetric secrets. On a protocol level, example embodiments may employ the concept that a credential (or secret) applied to an algorithm (which could be any algorithm) will reflect the generation of its delegation path by repeated application of a cryptographic hash function. Accordingly, for example, an original device having a credential may operate with the credential (or secret). However, once the original device delegates the credential to another device (e.g., another ObC enabled device), the original device may hash the credential prior to transferring (or delegating) the credential to the other device. Thus, the other device may receive a credential that is a hash of the original credential or secret. As such, if the original device operates with a credential denoted as a "secret", then the other device may operate with a hash of the credential that may be denoted as H(secret). If the other device then transfers (or delegates) the secret to a third device, the third device may receive a hash of the already hashed credential. Thus, the other device may generate a hash of H(secret) in order to create H(H(secret)), which may be received by the third device. The hashing functions described above may be conducted by the delegation manager 80. Moreover, in some embodiments, a secret chain or hash chain may be included in the hashing operation. Thus, for example, a newly credentialed secret may be k2=H(k, info), rather than just k2=H(k).

The delegation manager 80, when operating at any terminal that is preparing to transfer a credential to thereby delegate the credential to another device (e.g., the mobile terminal 10 or the second communication device 48), may be configured to apply a hash function to the credential to be transferred. The process of transferring, or delegating, a credential from one device (e.g., an ObC-enabled device) to another device (e.g., another ObC-enabled device) may comprise self-provisioning. As such, in some embodiments, the delegation manager 80 may be configured to handle self-provisioning. Thus, for example, the delegation manager 80 may be provided to generate a protocol for application in any trusted execution environment (TEE) where applications can delegate information to one another in a context where both the authenticity of the receiving device and its credential application can be guaranteed. This may be done, for example, in dedicated secure elements such as smart cards that are assigned to a single purpose.

Figure 4:
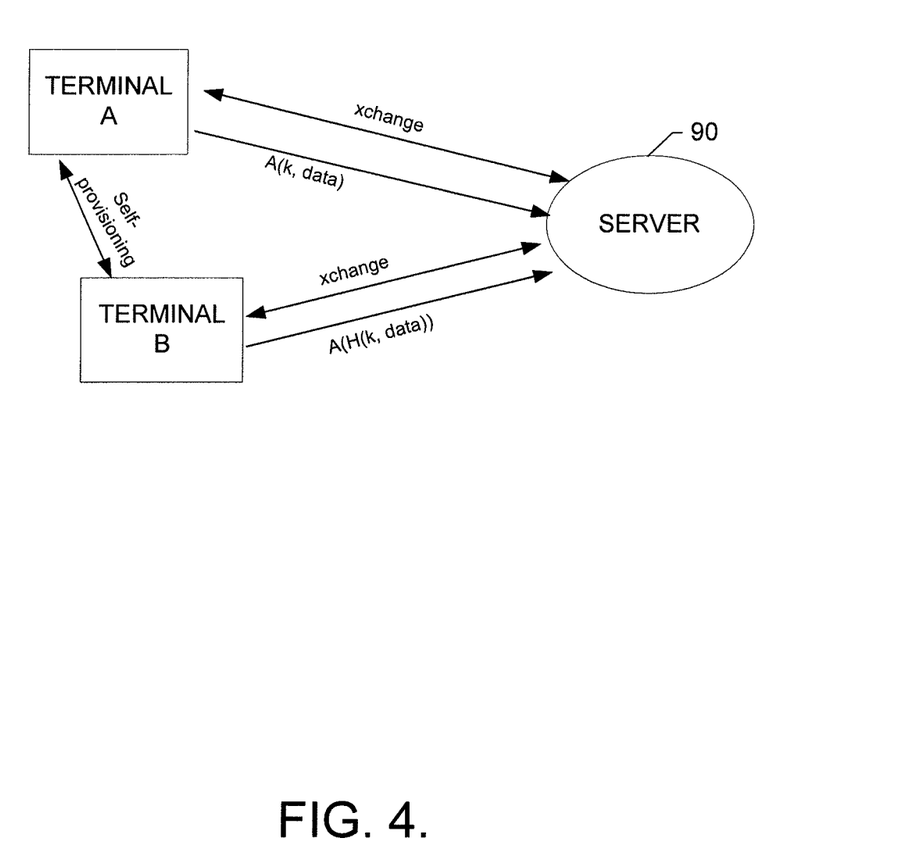
FIG. 4 illustrates an example secret delegation process that may be provided according to an example embodiment.

FIG. 4 illustrates an example secret delegation process that may be provided according to an example embodiment. As shown in FIG. 4, a first device (terminal A (e.g., the mobile terminal 10)) and a second device (terminal B (e.g., the second communication device 48)) may each be capable of communication with a server 90 (e.g., the service platform 60). In this example, a secret (K) may be provided to terminal A. Without specifying how the provisioning of the original secret K is performed to terminal A (it may be, for example, user entry or external ObC provisioning), FIG. 4 illustrates that terminal A authenticates to a service associated with the server 90 using an algorithm (A) that may be, for example, any authentication, payment, ticketing or other algorithm associated with a distributed application. Algorithm A may be keyed by K and terminal A may then perform self-migration of the secret K in the context of algorithm A to terminal B. The self-migration may enforce the secret K to turn it into H(K) in terminal B. The exact format of function H is not necessarily fixed, but may be any consistent function that will not conflict with other functions that may be used in connection with algorithm A. As such, an instance of the delegation manager 80 may function at each of terminal A and terminal B to handle the secret and any hashing associated with the secret in the context of transferring the secret. In some embodiments, the delegation manager 80 (e.g., when instantiated at a device performing validation (e.g., the server 90)) may be enabled to apply authentication and/or authorization algorithms (e.g., by limited trial-and-error in some cases) to determine the "delegation generation" of the secret used in the protocol and adjust accordingly. As such, the delegation manager 80 may be configured to utilize a hash chain of secrets as an indication of secret delegation.

In general, application binding may be somewhat problematic in some contexts. By applying the delegation manager 80 in an ObC environment, all necessary primitives for achieving application binding may be provided. In this regard, for example, a credential secret may initially be remotely provisioned to a credential program or locally provisioned (e.g., on entry to a credential application). In ObC, prior to delegation from a first device (terminal A) to a second device (terminal B), the second device (terminal B) may be authenticated via its platform certificate. By default, ObC provides certificates in an x.509 format, but formats more easily resolvable by ObC programs may also be constructed. Thus, the first device (terminal A) may determine that the receiving device is one where ObC runs natively in the TEE. Any RSA key $PK_B$ that is generated by an ObC program may be assigned to serve only that corresponding specific program. This fact may additionally be attested to with a signature by terminal B's platform key. Thus, terminal A may determine that, for example, the receiving device (terminal B) has a decryption key $SK_B$ (secret component of $PK_B$) that is only available to the code with the same signature (hash) as the code that currently runs in terminal A, and that the public component of that decryption key is the one present in the attestation evidence. With this is determined that any information encrypted with $PK_B$ is only decryptable by the same code in another approved device. Terminal A may therefore take its secret K, calculate H(K) and send H(K) encrypted with the public key $PK_B$ to terminal B. The code in terminal B may then decrypt the secret H(K), and self-provision it to itself. Since the codes in terminal A and terminal B are equivalent, terminal A may be satisfied with respect to the manner in which the secret will be stored in terminal B, which is the same way it would be stored in terminal A. Terminal B may then be enabled to use the received secret in the same way that terminal A would use the original secret (e.g., using the same code), with the exception that the secret in terminal B is a hash of the secret in terminal A. As indicated above, an external party, such as the server 90, may be enabled to tell the generational differences in the secrets used.

As can be appreciated from the description above, delegation according to an example embodiment may be provided in a relatively lightweight, but powerful manner. In some cases, example embodiments may be employed in the context of providing backup passwords, where a server may release an original secret to a device that has H(secret), or assign a new secret to devices that are enabled to produce a hash of some original secret. This mode of operation may be fully detached from the algorithm used with the secret. Thus, the mechanism may be suitable for use in any credential context, independent of the specific credential employed.

It may also be appreciated that servers or validating entities that are expected to recognize the above-described mechanism of delegating secrets may be upgraded or otherwise equipped to understand and/or test the authentication based on secrets processed in a delegation chain. A server that is not equipped to understand or test the authentication in this manner may simply return an error until the server is upgraded. In some cases, a server or a service may determine a limit to the number of layers of delegation to accept, or if, for example, the use of a delegated secret is only used as a proof inside a reprovisioning activity.

In some embodiments, both sending and receiving of credential information associated with creation of a hash chain for secret delegation may be handled by a stand-alone subroutine in an ObC context. Thus, for example, the delegation manager 80 may be instantiated at any device and operate based on loading a corresponding subroutine into the device to handle sending of secrets (after hashing in the context of delegation) and handle receiving of the secrets and subsequent usage as described herein. Thus, example embodiments may be practiced in the context of implementation packaged in a reusable manner, attachable to any credential that needs migration without modification to the core operations of ObC. In that respect, needed functionality may be provided in a support library associated with the delegation manager 80.

Example embodiments may therefore provide for use of a hash chain of secrets as an indication of off-line delegation of secrets between devices. Combined with a TEE implementation of a self-delegating system, a lightweight system may be provided with a trust chain at the fundamental level of the delegation and migration processes. Example embodiments may also enable self-delegation as an algorithm involving steps of validating peer certification and equivalence of codebase based on attestation evidence prior to information transfer.

Figure 5:
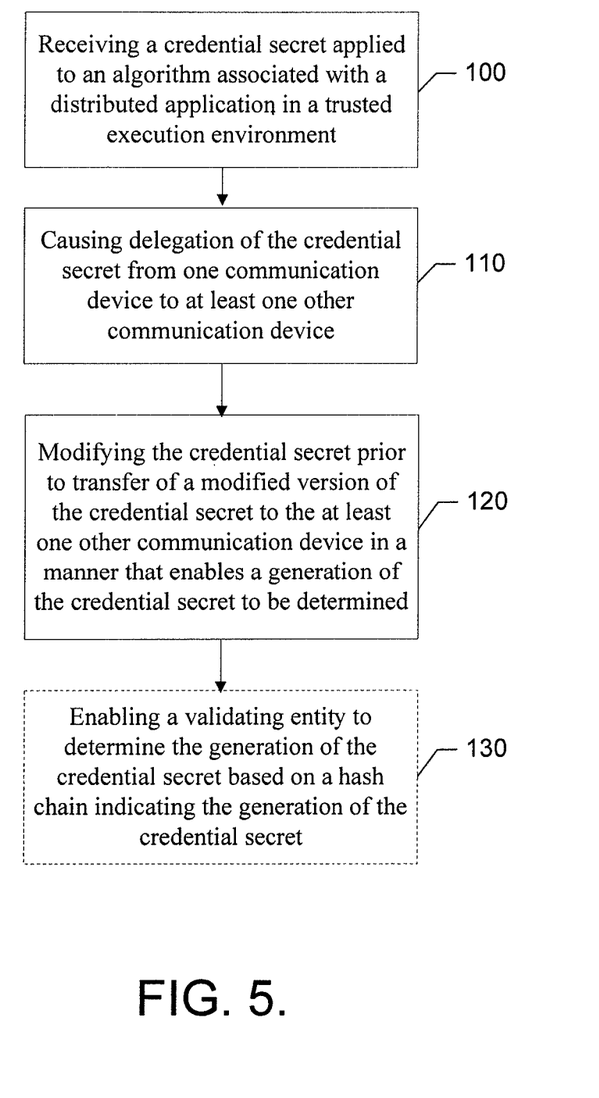
FIG. 5 is a flowchart according to an example method for providing secret delegation according to an example embodiment of the present invention.

FIG. 5 is a flowchart of a system, method and program product according to example embodiments of the invention. It will be understood that each block of the flowchart, and combinations of blocks in the flowchart, may be implemented by various means, such as hardware, firmware, processor, circuitry and/or other device associated with execution of software including one or more computer program instructions. For example, one or more of the procedures described above may be embodied by computer program instructions. In this regard, the computer program instructions which embody the procedures described above may be stored by a memory device of an apparatus employing an embodiment of the present invention and executed by a processor in the apparatus. As will be appreciated, any such computer program instructions may be loaded onto a computer or other programmable apparatus (e.g., hardware) to produce a machine, such that the resulting computer or other programmable apparatus embody a mechanism for implementing the functions specified in the flowchart block(s). These computer program instructions may also be stored in a computer-readable storage memory (as opposed to a transmission medium such as a carrier wave or electromagnetic signal) that may direct a computer or other programmable apparatus to function in a particular manner, such that the instructions stored in the computer-readable memory produce an article of manufacture the execution of which implements the function specified in the flowchart block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart block(s). As such, the operations of FIG. 5, when executed, convert a computer or processing circuitry into a particular machine configured to perform an example embodiment of the present invention. Accordingly, the operations of FIG. 5 define an algorithm for configuring a computer or processing circuitry (e.g., processor 70) to perform an example embodiment. In some cases, a general purpose computer may be provided with an instance of the delegation manager 80, which performs the algorithm shown in FIG. 5 (e.g., via configuration of the processor 70), to transform the general purpose computer into a particular machine configured to perform an example embodiment.

Accordingly, blocks of the flowchart support combinations of means for performing the specified functions, combinations of operations for performing the specified functions and program instructions for performing the specified functions. It will also be understood that one or more blocks of the flowchart, and combinations of blocks in the flowchart, can be implemented by special purpose hardware-based computer systems which perform the specified functions or operations, or combinations of special purpose hardware and computer instructions.

In this regard, one embodiment of a method according to an example embodiment as shown in FIG. 5 may comprise receiving a credential secret applied to an algorithm associated with a distributed application in a trusted execution environment at operation 100, causing delegation of the credential secret from one communication device to at least one other communication device at operation 110, and modifying the credential secret prior to transfer of a modified version of the credential secret to the at least one other communication device in a manner that enables a generation of the credential secret to be determined at operation 120.

In some embodiments, certain ones of the operations above may be modified or further amplified as described below. Moreover, in some embodiments additional optional operations may also be included (an example of which is shown in dashed lines in FIG. 5). It should be appreciated that each of the modifications, optional additions or amplifications below may be included with the operations above either alone or in combination with any others among the features described herein. In an example embodiment, the method may further comprise enabling a validating entity to determine the generation of the credential secret based on a hash chain indicating the generation of the credential secret at operation 130. In some embodiments, receiving the credential secret may comprise receiving the credential secret in association with an algorithm comprising an authentication, payment, or ticketing algorithm. In an example embodiment, causing delegation of the credential secret may comprise delegating the credential secret online or off-line. In some embodiments, in addition to or as an alternative to the above, modifying the credential secret may comprise hashing the credential secret. In some embodiments, hashing the credential secret may comprise hashing a credential secret that was previously hashed when delegated to the one communication device from an originating device. In an example embodiment, in addition to or as an alternative to the above, modifying the credential secret may comprise establishing information indicative of a hash chain associated with the credential secret, the hash chain indicating the generation of the credential secret.

In an example embodiment, an apparatus for performing the method of FIG. 5 above may comprise a processor (e.g., the processor 70) configured to perform some or each of the operations (100-130) described above. The processor 70 may, for example, be configured to perform the operations (100-130) by performing hardware implemented logical functions, executing stored instructions, or executing algorithms for performing each of the operations. Alternatively, the apparatus may comprise means for performing each of the operations described above. In this regard, according to an example embodiment, examples of means for performing operations 100-130 may comprise, for example, the delegation manager 80. Additionally or alternatively, at least by virtue of the fact that the processor 70 may be configured to control or even be embodied as the delegation manager 80, the processor 70 and/or a device or circuitry for executing instructions or executing an algorithm for processing information as described above may also form example means for performing operations 100-130.

An example of an apparatus according to an example embodiment may comprise at least one processor and at least one memory including computer program code. The at least one memory and the computer program code may be configured to, with the at least one processor, cause the apparatus to perform the operations 100-130 (with or without the modifications and amplifications described above in any combination).

An example of a computer program product according to an example embodiment may comprise at least one computer-readable storage medium having computer-executable program code portions stored therein. The computer-executable program code portions may comprise program code instructions for performing operation 100-130 (with or without the modifications and amplifications described above in any combination).

In some cases, the operations (100-130) described above, along with any of the modifications may be implemented in a method that involves facilitating access to at least one interface to allow access to at least one service via at least one network. In such cases, the at least one service may be said to perform at least operations 100-130.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A method comprising:
    receiving, by an apparatus, a credential secret applied to an algorithm associated with a distributed application in a trusted execution environment;
    causing delegation of the credential secret from the apparatus to at least one other communication device; and
    modifying, by the apparatus, the credential secret prior to transfer to the at least one other communication device, wherein the modifying forms a modified version of the credential secret by at least hashing a hash chain and the credential secret and encrypting, using a public key of the at least one other communication device, the hashed hash chain and credential secret, wherein the delegated modified version of the credential secret enables the at least one other communication device to use the hashed credential secret as a key to enable communication with the distributed application also being accessed by the apparatus and the hash chain enabling a determination, by the distributed application, of generation of the credential secret.

2. The method of claim 1, wherein receiving the credential secret further comprises receiving the credential secret in association with an algorithm comprising an authentication, payment, or ticketing algorithm.

3. The method of claim 1, wherein causing delegation of the credential secret further comprises delegating the credential secret online or off-line.

4. The method of claim 1, wherein hashing the credential secret further comprises hashing a credential secret that was previously hashed when delegated to the apparatus from an originating device.

5. The method of claim 1, wherein modifying the credential secret further comprises establishing information indicative of the hash chain associated with the credential secret, the hash chain indicating the generation of the credential secret, wherein the modified version of the credential secret comprises the information indicative of the hash chain.

6. The method of claim 1, further comprising enabling a validating entity to determine the generation of the credential secret based on the hash chain hash chain indicating the generation of the credential secret.

7. An apparatus comprising at least one processor and at least one memory including computer program code, the at least one memory and the computer program code configured to, with the at least one processor, cause the apparatus to at least:
    receive, by the apparatus, a credential secret applied to an algorithm associated with a distributed application in a trusted execution environment;
    cause delegation of the credential secret from the apparatus to at least one other communication device; and
    modify, by the apparatus, the credential secret prior to transfer to the at least one other communication device, wherein the modifying forms a modified version of the credential secret by at least a hash of a hash chain and the credential secret and encrypt, using a public key of the at least one other communication device, of the hashed hash chain and credential secret, wherein the delegated modified version of the credential secret enables the at least one other communication device to use the hashed credential secret as a key to enable communication with the distributed application also being accessed by the apparatus and the hash chain enabling a determination, by the distributed application, of generation of the credential secret.

8. The apparatus of claim 7, wherein the apparatus is further configured to at least receive the credential secret by at least receive the credential secret in association with an algorithm comprising an authentication, payment, or ticketing algorithm.

9. The apparatus of claim 7, wherein the apparatus is further configured to at least cause delegation of the credential secret by at least delegate the credential secret online or off-line.

10. The apparatus of claim 7, wherein apparatus is further configured to at least hash the credential secret by at least hash a credential secret that was previously hashed when delegated to the apparatus from an originating device.

11. The apparatus of claim 7, wherein the apparatus is further configured to at least establish information indicative of the hash chain associated with the credential secret, the hash chain indicating the generation of the credential secret, wherein the modified version of the credential secret comprises the information indicative of the hash chain.

12. The apparatus of claim 7, wherein the apparatus further configured to enable a validating entity to determine the generation of the credential secret based on the hash chain indicating the generation of the credential secret.

13. A computer program product comprising a non-transitory computer-readable medium bearing computer program code embodied therein for use with a computer, the computer program code comprising code for at least:
    receiving, by an apparatus, a credential secret applied to an algorithm associated with a distributed application in a trusted execution environment;
    causing delegation of the credential secret from the apparatus to at least one other communication device; and modifying, by the apparatus, the credential secret prior to transfer to the at least one other communication device, wherein the modifying forms a modified version of the credential secret by at least hashing a hash chain and the credential secret and encrypting, using a public key of the at least one other communication device, the hashed hash chain and credential secret, wherein the delegated modified version of the credential secret enables the at least one other communication device to use the hashed credential secret as a key to enable communication with the distributed application also being accessed by the apparatus and the hash chain enabling a determination, by the distributed application, of generation of the credential secret.

14. The computer program product of claim 13, wherein receiving the credential secret further comprises receiving the credential secret in association with an algorithm comprising an authentication, payment, or ticketing algorithm.

15. The computer program product of claim 13, wherein causing delegation of the credential secret further comprises delegating the credential secret online or off-line.

16. The computer program product of claim 13, further comprising enabling a validating entity to determine the generation of the credential secret based on the hash chain indicating the generation of the credential secret, wherein the modified version of the credential secret comprises the information indicative of the hash chain.

\* \* \* \* \*